(No Model.)

J. T. LA TURNO.
POWER TRANSMITTING PULLEY.

No. 306,267. Patented Oct. 7, 1884.

WITNESSES:
Otto Beyer
C. Sedgwick

INVENTOR:
J. T. La Turno
BY Munn & Co.
ATTORNEYS.

UNITED STATES PATENT OFFICE.

JOHN T. LA TURNO, OF ARMSTRONG, MISSOURI.

POWER-TRANSMITTING PULLEY.

SPECIFICATION forming part of Letters Patent No. 306,267, dated October 7, 1884.

Application filed July 10, 1884. (No model.)

*To all whom it may concern:*

Be it known that I, JOHN T. LA TURNO, of Armstrong, in the county of Howard and State of Missouri, have invented certain new and useful Improvements in Power-Transmitting Pulleys, of which the following is a full, clear, and exact description.

The object of my invention is to lessen the number of pulleys required to drive machinery that is to be stopped occasionally from the main line or driving shaft, and to reduce the wear and tear on the driving-belts and avoid sudden shocks to or breakage of parts in starting the machinery.
The invention includes the particular constructions and combinations of the pulley and a clutch mechanism by which a sectional loose pulley may be clutched to the shaft on which it is placed to be driven thereby, all as hereinafter fully described and claimed.

Figure 1:
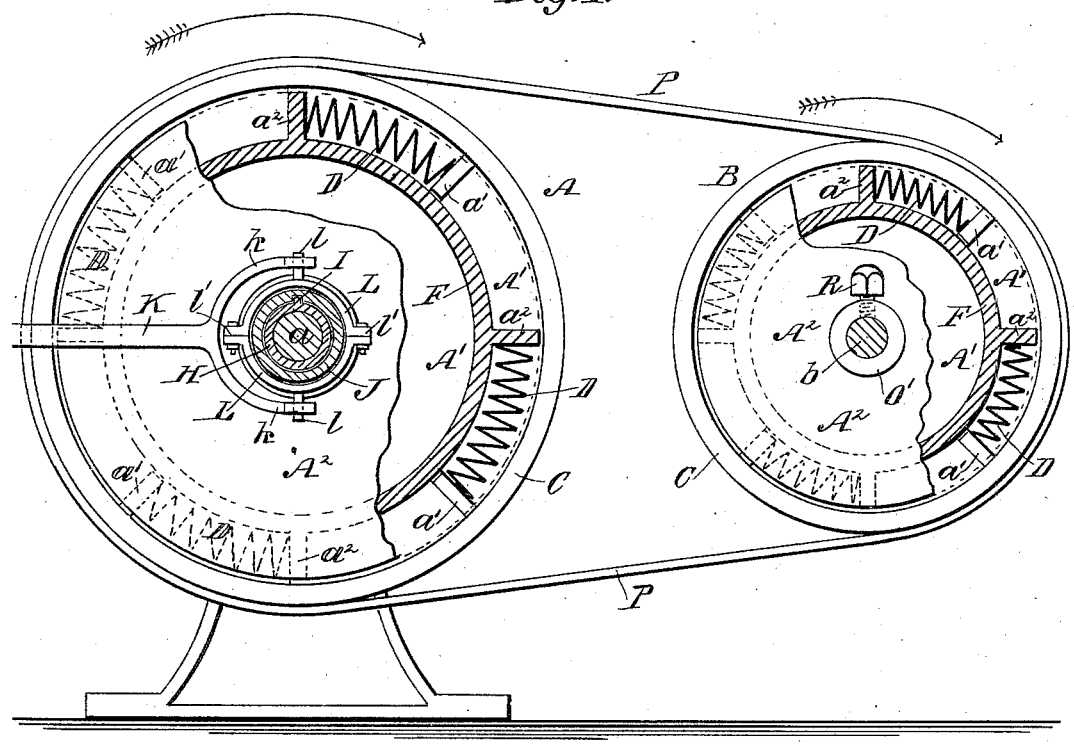
Figure 2:
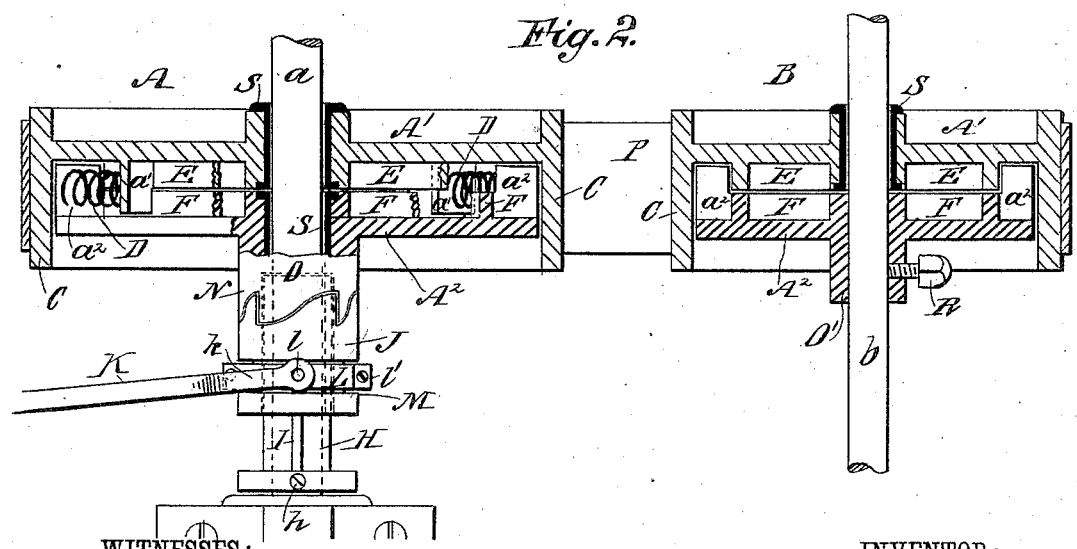

Reference is to be had to the accompanying drawings, forming part of this specification, in which similar letters of reference indicate corresponding parts in both the figures.
Figure 1 is a side elevation, partly broken away, of two pulleys mounted on independent shafts and connected by a belt, one of said pulleys being arranged as a loose pulley, and the other as a tight pulley, and Fig. 2 is a sectional plan view of the same.

The letters A B indicate, respectively, the loose and tight pulleys, both embodying the principal feature of my invention, and mounted, respectively, on the main power-shaft $a$, and a counter-shaft, $b$, which latter may be the driving-shaft of a machine of any kind.

The pulley A is composed of two main parts or sections—viz., a section, A', fitted loosely on the shaft $a$ and having the belt-rim C of the pulley formed on it, and a section, A², also fitted loosely on the shaft and passing loosely within the rim C of the section A'.

The pulley-sections A' A² have fixed to them respectively on their opposing faces the lugs $a'$ $a^2$, and suitable spiral springs, D, are placed between the pulley-sections, and so that one end of each spring will come against a lug, $a'$, of section A', and the other end of the spring will come against a lug, $a^2$, of the section A².
Flanges E F are formed on or fixed to the opposing faces of the pulley-sections A' A², the flanges rising or projecting from the faces of the sections for about half the width of the space between them and at the inner edges or ends of the lugs $a'$ $a^2$, so that the flanges together form a pocket around the pulley next to the inside face of the rim, in which the springs D are held to place between the opposing pairs of lugs. There may be as many of these springs D as the circumference of the pulley will admit of, and the tension or resistance to compression of the springs may vary with the power required to be taken from the pulley.

H is a sleeve fixed to the shaft $a$ by a set-screw, $h$, or otherwise, so as to revolve with the shaft, and having a key or feather, I, and J is a half-clutch fitted on the sleeve and around the feather I, so as to be rotated continuously by the shaft, and adapted also to be slid along the sleeve by a shifting-lever, K, which engages by holes in its forked arms $k$ $k$ with opposite pins, $l$ $l$, of a collar or strap, L, which is made in halves bolted together at $l'$ $l'$, and so as to hold the collar L in an annular groove, M, made in the periphery of the half-clutch J. The other half, N, of the clutch is formed upon the hub O of the section A² of the pulley.

It is evident that when the half-clutch J is thrown out of the half-clutch N, the pulley A will not turn to transmit power by the belt P to the pulley B, the driving-shaft $a$ meanwhile turning continuously through the pulley A; hence there is no wear on the belt, as when the belt is thrown from a tight to a loose pulley on the main driving-shaft, and from a tight to a loose pulley on the shaft $b$ of the machine to be driven, and but a single pulley on the main shaft and on the machine-shaft are required instead of a tight and loose pulley on each shaft, as commonly arranged. When the clutch J N is locked together by the shifting-lever K, as in Fig. 1, the pulley-section A² will first receive the driving-power of the shaft $a$, and will transmit it through the lugs $a^2$, springs F, and lugs $a'$ to the pulley-section A', and thence to the driving-belt P and pulley B.

It is evident that in starting the pulley A the springs D will be compressed more or less between the lugs $a'$ $a^2$ of the two pulley-sections, thereby preventing sudden shocks to or breakage of the pulley A, the belt P, or the machinery therewith connected, and the springs expand somewhat when the normal speed is reached, and insure a steady motion of the connected machinery.

The pulley B is made with half-sections A' A², lugs $a'$ $a^2$, springs D, and flanges E F, substantially as described above, for the pulley A, the only difference between the pulleys A B being that the hub O' of the pulley-section A² is made fast on the shaft $b$ by a set-screw, R, or otherwise, so that the pulley B is a fast or fixed pulley.

In driving the pulley B by the belt P, the loose section A' of said pulley transmits the power through the springs to the fixed section A², and thence to the shaft $b$.

I propose to line or bush the bearings of the loose sections of the pulleys with any suitable anti-friction metal, S, as shown in Fig. 2.

I have shown the sections of the pulleys made in solid disk form; but it is evident that they may be made with central hubs, and with outer portions carrying the lugs, and springs connected to the hubs by radial arms, as will readily be understood, and the springs between the sections may vary in form from that shown within the scope of my invention.

Either the tight or the loose pulley may be formed in halves diametrically, to allow them to be set anywhere on their respective shafts without taking the shafts from their bearings, as will readily be understood. The opposite flanges, E F, on the pulley-sections A' A², respectively, may be substituted, by one flange projecting inward from either section; but the construction shown is preferred.

I am aware that back-lash springs to relieve pinions and bevel-gears from strain while starting the machinery are not new, and I claim no such construction. By my construction the usual shock occasioned by connecting the clutch mechanism of the pulley with the clutch mechanism on the driving-shaft is avoided. There is a great difference between this sudden shock and the gradual strain between driving and transmitting power gears in starting.

Having thus described my invention, what I claim as new, and desire to secure by Letters Patent, is—

1. A power-transmitting pulley made in two sections placed loosely on a driving-shaft and provided with interior lugs and springs held between the lugs, and one of the pulley-sections carrying the pulley rim or face, and the other section carrying a clutch device, in combination with a clutch, J, splined to the driving-shaft, substantially as shown and described.

2. The combination, with the pulley A, made in two sections, A' A², fitted loosely on the driving-shaft and provided with lugs $a'$ $a^2$, and springs interposed between the lugs, of the sleeve H, having a feather, I, and fixed to the shaft, and the clutch J N, collar L, and lever K, substantially as shown and described.

JOHN T. LA TURNO.

Witnesses:
WILLIAM J. GREEN,
HENRY THAMER.